Nov. 13, 1962 H. F. LANGFELDER 3,063,241

JET PROPELLED AIRCRAFT

Filed Oct. 7, 1959 2 Sheets-Sheet 1

Nov. 13, 1962 H. F. LANGFELDER 3,063,241

JET PROPELLED AIRCRAFT

Filed Oct. 7, 1959 2 Sheets-Sheet 2

INVENTOR.
Helmut F. Langfelder

BY

Richard S. Striker
ATTORNEY

United States Patent Office 3,063,241

Patented Nov. 13, 1962

3,063,241

JET PROPELLED AIRCRAFT

Helmut F. Langfelder, Munich, Germany, assignor to Messerschmitt AG., Augsburg, Germany, a company of Germany Filed Oct. 7, 1959, Ser. No. 844,928
Claims priority, application Germany Jan. 31, 1959
3 Claims. (Cl. 60—35.55)

This invention relates to jet propelled aircraft.

In a vertical take-off and landing or in a short forward take-off and run-out with supersonic aircraft, the design of the aircraft for high velocity flight plays an important part. The wings must be of small span and thin. The small wing area means high wing loading. The application of lift-increasing expedients, for instance the blowing or drawing in of air in the employment of jet flaps, can in these circumstances make only minor contributions which at best may achieve a reduction in the distance of take-off and run-out, but which are inadequate for achieving vertical take-off and landing.

The necessary lift for a hover flight or for vertical motions in flight, especially when vertical speeds and forward velocities are low, as required when near the ground, can be provided only by the power unit itself, since the aerodynamic forces produced by the available flying surfaces are insufficient.

Several possible solutions have been proposed for utilising the thrust of the power unit to produce vertical or approximately vertical lift for take-off and landing, such as (1) The provision of supplementary lifting power units which are not used for forward propulsion.

(2) The provision of swivelling power units for producing both vertical lift and horizontal propulsion.

(3) The deflection of the exhaust jet of the power unit by means of aerodynamic effects or by the provision of deflectors in the path of the jet, thus employing the power units for producing both vertical lift and horizontal propulsion.

All these possibilities have drawbacks relating to their effect or involved in design and construction.

The provision of supplementary lifting power units is a compromise which, from the viewpoint of weight, appears to be uneconomical. The aircraft in flight would have to carry power units which are actually required only during take-off and landing.

The provision of swivelling power units give rise to difficulties with respect to the formation of the intake and the design of couplings for the attachment of pipes, supplementary servo-systems, and so forth.

Jet deflection through 90° or approximately 90° by means of deflecting devices in the exhaust jet at high velocities involves a considerable power loss by such deflection.

The present invention overcomes these drawbacks by effecting a deflection of the direction of thrust in the power unit itself and by tilting the jet nozzle pipe in relation to the other elements of the plant. The excellent efficiency achieved by this method is due to the fact that the velocity conditions which obtain inside the power unit are utilised to achieve the desired result.

Figure 1:
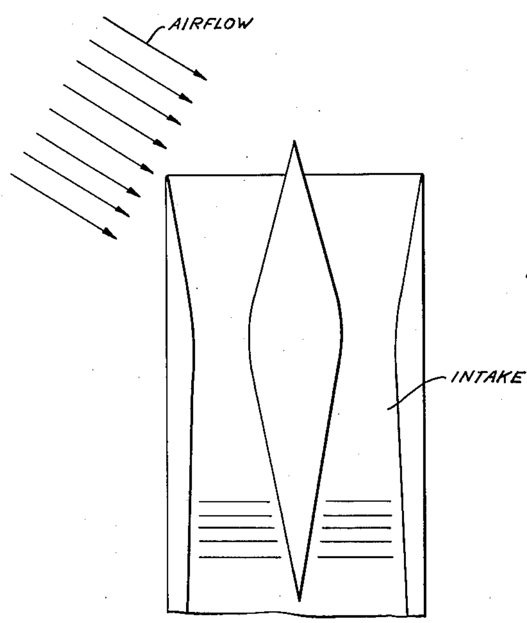
FIG. 1 is a longitudinal sectional view schematically illustrating flow conditions about a tilted jet engine.

The flow problems which arise when the air impinges obliquely on the intake and when the engine unit is tilted through 90° from a normal horizontal flying position into a vertical position at a speed which is considerable are shown in FIG. 1.

Figure 2:
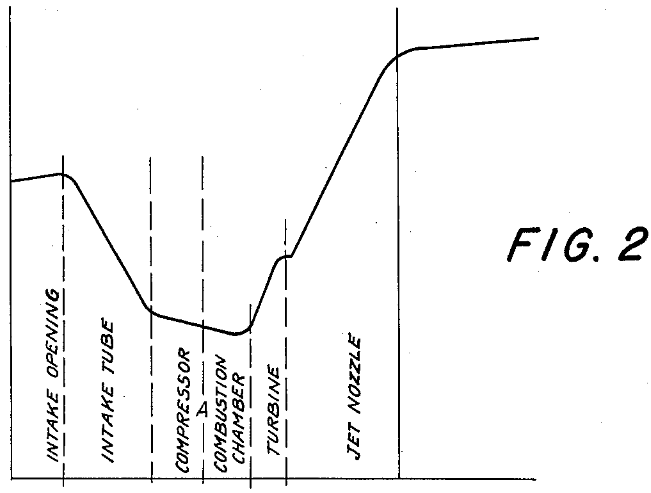
FIG. 2 is a diagram indicating the varying velocity of a fluid stream passing through a turbo jet engine.

It is desired to change the direction of flow at the exhaust in relation to that at the intake at the most favourable point for effecting the desired deflection that is where the velocity is at a minimum and pressure is high, in other words point A in FIG. 2. The novel type of power unit according to the invention permits the direction of thrust to be changed without the need of providing additional deflecting means in the exhaust of the plant, i.e. without incurring substantial losses in thrust.

The power unit of the invention is a twin circuit unit. The first circuit serves for driving a multi-stage compressor which compresses the air for the second circuit and delivers the same into a pivotally deflectable combustion chamber and jet pipe assembly. The combustion chamber proper and an after-burner are combined so that combustion proceeds at a more favourable, higher pressure than in a conventional after-burner and is therefore more efficient.

An intake *a* supplies air to a multi-stage compressor *b* where the airstream is divided into two circuits I and II. Airstream I passes through small combustion chambers *c* and is expanded in a single or in a multi-stage turbine *d* which drives the compressor *b*. The expanded gases are exhausted through three outlet means *i* which pass through air stream component II. The gases leave the power unit with a small increase in energy in the direction of forward flight.

Figure 3:
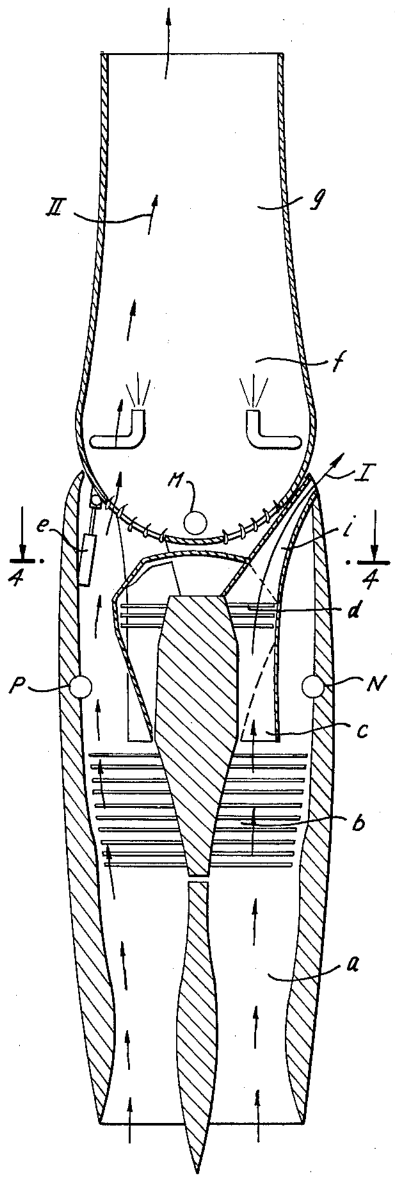
FIG. 3 is a longitudinal sectional view illustrating a jet engine according to the invention.
Figure 4:
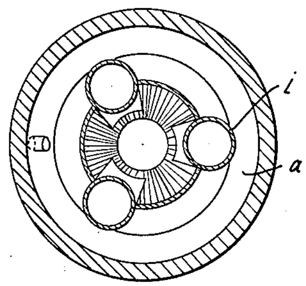
FIG. 4 is a cross sectional view taken on line 4—4 of FIG. 3.

Airstream II leaves the compressor *b* at a high pressure, by-passes the combustion chambers *c*, and receives further heat by cooling the combustion chamber *c*, and then enters the main combustion chamber *f* irrespectively of the amount of deflection about fulcrum M of the latter. Combustion in the combustion chamber *f* at high pressure is very efficient (fuel being injected for instance at *h*) because there is now no following driven turbine to be considered. The thrust generated in jet pipe *g* acts at the axis of the deflected pipe through point M. The deflection of the airstream II about point M along the arcuate end wall of the combustion chamber *f* causes a minimum loss of energy because at this point pressure is high and velocity relatively low. Point M (FIG. 3) corresponds with point A (FIG. 2) or is located in this range.

The deflectable assembly *g* can be pivotally tilted by means of an actuating cylinder *e* driven from the engine. The fixed part of the unit *a*, *b*, *c*, *d* also supplies all auxiliary services. Suspension in the aircraft of the fixed part of the power unit at points P, N and M is readily feasible.

I claim:

1. A jet engine comprising, in combination, a straight air intake tube adapted to be secured to an aircraft and having an outlet at the trailing end thereof; auxiliary combustion chamber means mounted in said air intake tube in a central region of the same; turbine means mounted in said air intake tube rearwardly of said combustion chamber means in said central region, and driven by combustion gases of said combustion chamber means, said turbine means exhausting into said outlet; compressor means mounted in said air intake tube forwardly of said combustion chamber means and operatively connected to said turbine means to be driven by the same to create an air flow having a first centrally located component entering said combustion chamber means and another component by-passing said turbine means and said combustion chamber means; and a straight tubular means mounted on said trailing end of said air intake tube for turning movement between a normal position coaxial with said air intake tube and aligned with the same and a turned position extending at an angle to said air intake tube, said tubular means including a jet nozzle portion and a main combustion chamber portion located adjacent said trailing end of said air intake tube and having an arcuate end wall extending over the trailing end of said air intake tube and being formed with inlet openings for said other component of the air flow and fuel supply means so that the combustion creates high pressure in said combustion chamber and the velocity of the gaseous matter increases in said jet nozzle portion, said outlet of said air intake tube being located outwardly of said inlet openings, said tubular means being turnable about a fulcrum located in said combustion chamber portion on the axis of said tubular means so that gaseous matter passing through said tubular means in said normal position produces an axial thrust on said air intake tube, and is deflected in said turned position in said combustion chamber where the pressure thereof is high and the velocity thereof is low to produce a thrust at an angle to the axis of said air intake tube.

2. A jet engine comprising, in combination, a straight air intake tube adapted to be secured to an air craft and having an outlet at the trailing end thereof; auxiliary combustion chamber means mounted in said air intake tube; turbine means mounted in said air intake tube and driven by combustion gases of said combustion chamber means, said turbine means exhausting into said outlet; compressor means mounted in said air intake tube operatively connected to said turbine means to be driven by the same to create an air flow having a first component passing into said combustion chamber means and another component by-passing said turbine means and said combustion chamber means; a straight tubular means mounted on said trailing end of said air intake tube for turning movement between a normal position coaxial with said air intake tube and aligned with the same and a turned position extending at an angle of substantially 90° to said air intake tube, said tubular means including a jet nozzle portion and a main combustion chamber portion located adjacent said trailing end of said air intake tube and having an arcuate end wall extending over the trailing end of said air intake tube and being formed with inlet openings for said other component of the air flow and fuel supply means so that the combustion creates high pressure in said combustion chamber and the velocity of the gaseous matter increases in said jet nozzle portion, said outlet of said air intake tube being located outwardly of said inlet openings, said tubular means being turnable about a transverse axis crossing the longitudinal axis of said tubular means and said other component and located in said combustion chamber portion so that gaseous matter passing through said tubular means in said normal position produces an axial thrust on said air intake tube, and is deflected in said turned position in said combustion chamber where the pressure thereof is high and the velocity thereof is low to produce a vertical thrust during take-off of the aircraft.

3. A jet engine comprising in combination, a straight air intake tube adapted to be secured to an aircraft and having an outlet at the trailing end thereof; combustion engine means mounted in said air intake tube and exhausting into said outlet; compressor means mounted in said air intake tube operatively connected to said combustion engine means to be driven by the same to create an air flow having a first component passing into said combustion engine means and another component by-passing said combustion engine means; and a straight tubular means mounted on said trailing end of said air intake tube for turning movement between a normal position coaxial with said air intake tube and aligned with same and a turned position extending at an angle of 90° to said air intake tube, said tubular means including a jet nozzle portion and a main combustion chamber portion located adjacent said trailing end of said air intake tube and having an arcuate end wall extending over the trailing end of said air intake tube and being formed with inlet openings for said other component of the air flow and fuel supply means so that the combustion creates high pressure in said combustion chamber and the velocity of the gaseous matter increases in said jet nozzle portion, said outlet of said air intake tube being located outwardly of said inlet openings, said tubular means being turnable about an axis perpendicular to the axis of said tubular means and to said other component and located in said combustion chamber portion crossing the axis of said tubular means so that gaseous matter passing through said tubular means in said normal position produces an axial thrust on said air intake tube, and is deflected in said turned position in said combustion chamber where the pressure thereof is high and the velocity thereof is low to produce a vertical thrust during take-off of the aircraft.

References Cited in the file of this patent

UNITED STATES PATENTS

| | | |
|---|---|---|
| 2,547,095 | Robins | Apr. 3, 1951 |
| 2,563,270 | Price | Aug. 7, 1951 |
| 2,609,659 | Price | Sept. 9, 1952 |
| 2,658,334 | Marchant | Nov. 10, 1953 |
| 2,694,897 | Roy | Nov. 23, 1954 |
| 2,857,740 | Hall et al. | Oct. 29, 1958 |
| 2,879,014 | Smith et al. | Mar. 24, 1959 |
| 2,912,188 | Singlemann et al. | Nov. 10, 1959 |
| 2,921,435 | Landgraf | Jan. 19, 1960 |
| 2,930,190 | Rogers | Mar. 29, 1960 |
| 2,979,900 | Hopper | Apr. 18, 1961 |
| 2,986,877 | Emmons et al. | June 6, 1961 |

FOREIGN PATENTS

| | | |
|---|---|---|
| 68,790 | France | Jan. 27, 1958 |
| 1,049,711 | Germany | Jan. 29, 1959 |
| 600,397 | Great Britain | Apr. 7, 1948 |